US012647147B2

(12) United States Patent
Ekbladh

(10) Patent No.: US 12,647,147 B2
(45) Date of Patent: *Jun. 2, 2026

(54) COMMUNICATION UNIT HAVING A FASTENING DEVICE FOR FASTENING TO A COMPONENT OF AN IN PARTICULAR SINGLE-TRACK VEHICLE

(71) Applicant: Robert Bosch GmbH, Stuttgart (DE)

(72) Inventor: Mats-Ake Ekbladh, Bjärred (SE)

(73) Assignee: ROBERT BOSCH GMBH, Stuttgart (DE)

( * ) Notice: Subject to any disclaimer, the term of this patent is extended or adjusted under 35 U.S.C. 154(b) by 741 days.

This patent is subject to a terminal disclaimer.

(21) Appl. No.: 17/962,074

(22) Filed: Oct. 7, 2022

(65) Prior Publication Data

US 2023/0353180 A1 Nov. 2, 2023

(30) Foreign Application Priority Data

Apr. 29, 2022 (DE) ..................... 20 2022 102 323.9

(51) Int. Cl.
*H04B 1/3822* (2015.01)

(52) U.S. Cl.
CPC ................................. *H04B 1/3822* (2013.01)

(58) Field of Classification Search
CPC ....... H04B 1/3822; A63B 21/008; B62J 11/00
See application file for complete search history.

(56) References Cited

U.S. PATENT DOCUMENTS

| | | | | |
|---|---|---|---|---|
| 5,368,122 A | * | 11/1994 | Chou | ...................... B62M 6/60 |
| | | | | 280/214 |
| 5,450,915 A | * | 9/1995 | Li | ........................... H02K 7/14 |
| | | | | 310/67 R |
| 5,662,187 A | * | 9/1997 | Mc Govern | ............. B62M 6/65 |
| | | | | 180/206.6 |
| 6,077,908 A | * | 6/2000 | Yahiro | .................... C08L 59/00 |
| | | | | 525/218 |
| 6,920,953 B2 | * | 7/2005 | McGovern | ............... B62M 6/45 |
| | | | | 280/258 |
| 8,654,818 B2 | * | 2/2014 | Kosugi | ................. H04L 1/0083 |
| | | | | 370/300 |
| 9,064,198 B2 | * | 6/2015 | Kato | ............... G06K 19/07773 |

(Continued)

FOREIGN PATENT DOCUMENTS

| | | | | |
|---|---|---|---|---|
| CA | 3004820 A1 | * | 11/2018 | ............. A63B 21/08 |
| CN | 205365900 U | * | 7/2016 | |

(Continued)

*Primary Examiner* — Hai V Nguyen
(74) *Attorney, Agent, or Firm* — NORTON ROSE FULBRIGHT US LLP

(57) ABSTRACT

The invention relates to a communication unit (100) having an electromagnetic transmitter and/or receiver unit (25) and a fastening device (1) for an electromagnetic transmitter and/or receiver device (25) for fastening to a component (6, 9), preferably to a drive unit (6) and/or a frame (9), preferably of a single-track vehicle such as an electric bicycle, including an in particular flat, essentially rectangular carrier (2), especially having two essentially oppositely situated sides (5, 5') on which the transmitter and/or receiver device (25) is situated,
at least one first holding element (3), the first holding element (3) being designed to fasten the carrier (2) to the component (6, 9) in a positionally stable manner.

18 Claims, 7 Drawing Sheets

(56) References Cited

U.S. PATENT DOCUMENTS

| | | | | |
|---|---|---|---|---|
| 9,156,398 B2* | 10/2015 | Voos | | B60R 9/00 |
| 9,777,774 B2* | 10/2017 | Biechele | | B62K 19/34 |
| 10,011,342 B2* | 7/2018 | Gai | | B63H 25/38 |
| 10,076,929 B1* | 9/2018 | Lenz | | B62L 5/00 |
| 10,320,912 B2* | 6/2019 | Wang | | H04L 67/12 |
| 10,601,254 B2* | 3/2020 | Kato | | G06K 19/07771 |
| 10,645,708 B2* | 5/2020 | Klemp | | H04W 72/563 |
| 10,773,765 B2* | 9/2020 | Mühle | | B62J 15/02 |
| 11,218,788 B2* | 1/2022 | Champagne | | H04R 1/026 |
| 11,377,167 B2* | 7/2022 | Le Rodallec | | B60L 53/14 |
| 11,827,301 B2* | 11/2023 | Hallen | | B62J 45/20 |
| 12,049,274 B2* | 7/2024 | Montague | | B62J 7/06 |
| 12,168,495 B2* | 12/2024 | Komada | | B62M 25/08 |
| 2004/0003952 A1* | 1/2004 | McGovern | | B62M 6/60 |
| | | | | 180/220 |
| 2004/0179206 A1* | 9/2004 | Tassakos | | G01B 11/00 |
| | | | | 356/602 |
| 2007/0252703 A1* | 11/2007 | Kato | | G06K 19/07749 |
| | | | | 340/572.7 |
| 2012/0236951 A1* | 9/2012 | Kosugi | | H04L 1/0061 |
| | | | | 375/259 |
| 2014/0055253 A1* | 2/2014 | Voos | | B60R 9/00 |
| | | | | 340/431 |
| 2014/0196970 A1* | 7/2014 | Biechele | | B62K 19/34 |
| | | | | 180/206.4 |
| 2014/0319299 A1* | 10/2014 | Baum | | B60C 23/0452 |
| | | | | 248/251 |
| 2015/0016563 A1* | 1/2015 | Mahdavifar | | H04B 7/0697 |
| | | | | 375/295 |
| 2016/0014793 A1* | 1/2016 | Klemp | | H04B 7/088 |
| | | | | 370/329 |
| 2018/0301035 A1* | 10/2018 | Tetsuka | | G08G 1/163 |
| 2018/0316763 A1* | 11/2018 | Wang | | H04W 4/70 |
| 2018/0326255 A1* | 11/2018 | Schranz | | A63B 21/08 |
| 2018/0370594 A1* | 12/2018 | Foley | | B62K 19/40 |
| 2019/0074725 A1* | 3/2019 | Kato | | H02J 50/12 |
| 2019/0382067 A1* | 12/2019 | Mühle | | B62M 6/90 |
| 2020/0050204 A1* | 2/2020 | Chang | | H04W 76/10 |
| 2020/0223507 A1* | 7/2020 | Le Rodallec | | B60L 53/16 |
| 2020/0251917 A1* | 8/2020 | Ljung | | H02J 50/80 |
| 2020/0269951 A1* | 8/2020 | Gruber | | B62M 11/02 |
| 2021/0070397 A1* | 3/2021 | Komada | | B62M 9/132 |
| 2021/0197913 A1* | 7/2021 | Montez | | B62K 23/02 |
| 2021/0221211 A1* | 7/2021 | Borroni-Bird | | B62M 6/85 |
| 2021/0371044 A1* | 12/2021 | Kosaka | | B62M 25/08 |
| 2021/0377638 A1* | 12/2021 | Champagne | | H04R 3/00 |
| 2022/0041116 A1* | 2/2022 | Lev | | B60R 11/02 |
| 2022/0106002 A1* | 4/2022 | Montague | | B62J 45/00 |
| 2022/0306043 A1* | 9/2022 | Ford | | B62H 5/08 |
| 2022/0306226 A1* | 9/2022 | Miller | | B62H 5/14 |
| 2022/0306237 A1* | 9/2022 | Miller | | B62J 50/20 |
| 2022/0307295 A1* | 9/2022 | Liedtke | | E05B 77/02 |
| 2022/0311468 A1* | 9/2022 | Stephens | | H04W 4/80 |
| 2022/0332260 A1* | 10/2022 | Lindstedt | | H04M 1/724098 |
| 2022/0332389 A1* | 10/2022 | Braedt | | B62J 43/28 |
| 2023/0078660 A1* | 3/2023 | Kosaka | | B62J 50/21 |
| | | | | 280/288.4 |
| 2023/0085552 A1* | 3/2023 | Schnee | | G08B 25/016 |
| | | | | 455/404.1 |
| 2023/0126940 A1* | 4/2023 | Hsu | | B62J 43/20 |
| | | | | 280/288.4 |
| 2023/0241986 A1* | 8/2023 | Saal | | B60L 53/12 |
| | | | | 320/108 |
| 2023/0269605 A1* | 8/2023 | Masuda | | H04W 24/02 |
| | | | | 455/103 |
| 2023/0336006 A1* | 10/2023 | Kobayashi | | H02J 7/0031 |
| 2023/0353179 A1* | 11/2023 | Liu | | H04B 1/3822 |
| 2023/0408595 A1* | 12/2023 | Ikeda | | H02J 7/06 |
| 2024/0326761 A1* | 10/2024 | Putz | | B60T 8/172 |
| 2024/0334346 A1* | 10/2024 | Chiang | | G08G 1/16 |

FOREIGN PATENT DOCUMENTS

| | | | | | |
|---|---|---|---|---|---|
| EP | 0980821 B1 * | 10/2010 | | | B62M 6/65 |
| EP | 2946959 A2 * | 11/2015 | | | B60K 17/04 |
| EP | 3614360 A1 * | 2/2020 | | | G08G 1/161 |
| EP | 3756985 A1 * | 12/2020 | | | H02J 50/05 |
| EP | 4046873 A1 * | 8/2022 | | | B60R 9/06 |
| EP | 3652017 B1 * | 10/2024 | | | B60L 53/63 |
| TW | M631683 U * | 9/2022 | | | |
| WO | WO-2016091319 A1 * | 6/2016 | | | B60L 53/305 |

* cited by examiner

COMMUNICATION UNIT HAVING A FASTENING DEVICE FOR FASTENING TO A COMPONENT OF AN IN PARTICULAR SINGLE-TRACK VEHICLE

CROSS REFERENCE

The present application claims the benefit under 35 U.S.C. § 119 of German Patent Application No. DE 20 2022 102 323.9 filed on Apr. 29, 2022, which is expressly incorporated herein by reference in its entirety.

BACKGROUND INFORMATION

The present invention relates to a communication unit having an electromagnetic transmitter and/or receiver unit and a fastening device for the electromagnetic transmitter and/or receiver device for fastening to a component, preferably to a drive unit or a frame of a vehicle of an in particular single-track vehicle, in particular an electric bicycle, a pedelec or the like.

In addition, the present invention relates to an in particular single-track vehicle including a communication unit.

The present invention furthermore pertains to a drive unit for a vehicle, in particular for a single-track vehicle equipped with a communication unit.

Although the present invention can basically be applied to various kinds of vehicles, the present invention will be described with reference to bicycles in the form of electric bicycles or pedelecs.

Although it is generally possible to apply the present invention to all kinds of electromagnetic transmitter and/or receiver devices, the present invention is described with reference to an antenna as a transmitter and/or receiver device.

Antennas are often mounted on electric bicycles and employed there for transmitting and receiving GPS data, for instance. This makes it possible to determine the speed or the position of the electric bicycle. In one conventional solution from the related art, the antenna is accommodated on a drive unit of the electric bicycle for retrofitting, so that it can easily be connected to a control device of the electric bicycle and is protected from external effects such as rain. The antenna is loosely placed into a housing of the drive unit in this case.

In conventional electric bicycles, the transmission and receiving quality of the antenna is negatively affected because the antenna is usually mounted too closely to metallic components that can affect the transmission power output. In addition, the antenna points in the direction of the base, which likewise has a negative effect on the transmission power output.

SUMMARY

In one example embodiment, the present invention provides a communication unit having an electromagnetic transmitter and/or receiver device and a fastening device for the electromagnetic transmitter and/or receiver device for fastening to a component, preferably to a drive unit and/or a frame, of a vehicle, preferably a single-track vehicle such as an electric bicycle, including an in particular flat and essentially rectangular carrier, especially having two essentially oppositely situated sides on which a transmitter and receiver device can be positioned, at least a first holding element, the first holding element being designed to fasten the carrier to the component in a positionally stable manner.

In one example embodiment, the present invention provides an in particular single-track vehicle, which includes a communication unit having an electromagnetic transmitter and/or receiver device and a fastening device, as disclosed herein.

One of the advantages achieved in this way is that the transmitter and/or receiver device of the communication unit is able to be fastened to the component of the in particular single-track vehicle simply yet accurately in terms of the position and angle, and thus in a reproducible manner. A further advantage is that the position and the angle of the transmitter and/or receiver device are able to be adapted or optimized away from interfering components of the vehicle so that the transmission and/or receiving power output is improved.

The communication device has an electromagnetic transmitter and/or receiver device and a fastening device for fastening the transmitter and/or receiver device to a component of the in particular single-track vehicle. The fastening device includes a carrier. More specifically, the in particular flat and essentially rectangular carrier may be understood as a holding means, a housing or the like for the transmitter and/or receiver device. The carrier may have different geometrical shapes. More specifically, it has a low height in comparison with the length and width of the carrier. The cross-section of the carrier in the direction of the length and width may essentially be rectangular. Thus, the carrier may have two essentially rectangular sides that are situated opposite each other, i.e., a topside and an underside—as well as four narrow lateral sides.

As an alternative, the cross-section of the carrier may also be round or oval. In the fastened state, that is, in a state when the carrier is situated on a component of the single-track vehicle, e.g., an electric bicycle, one of the two sides may be pointing toward the component or the in particular single-track vehicle, and the other side may be pointing away from the component or the in particular single-track vehicle. In the following text, the side pointing toward the component or the vehicle, in particular the electric bicycle, is referred to as the 'underside' and the side pointing away as the 'topside'.

The fastening device furthermore includes at least a first holding element, the first holding element being designed to fasten the carrier to a component in a positionally stable and reversible manner. In particular, a drive unit and/or a frame is/are provided as a component of the in particular single-track vehicle. The first holding element is particularly developed in such a way that it fastens the carrier to the component in a reversible manner, preferably with the aid of a screwed connection. Within the framework of the present invention, 'positionally stable' particularly means that the first holding element is able to be reversibly fastened to a component of the in particular single-track vehicle so that the carrier assumes a stable and accurate, and thus a reproducible or accurately repeatable, mounting position with regard to a position and/or angle. A positionally stable fastening of the carrier especially allows for the reliable fastening of the communication unit to the component. In one embodiment, the first holding element can be fastened to the component in a positionally stable and reversible manner with the aid of a screwed connection. In contrast thereto, a loose fastening, e.g., by a loose insertion, of the communication unit into a housing of a drive unit, does not enable a positionally stable fastening.

Further features, advantages and additional embodiments of the present invention are disclosed herein.

According to one example embodiment of the present invention, the first holding element defines a fastening plane, and the carrier defines a carrier plane, the carrier plane having an angle of between –60° and 90°, preferably between –10° and 90°, in particular between 0° and 90°, relative to the fastening plane.

The fastening plane is defined as a plane through the part of the first holding element that is situated directly on a component of the vehicle in the fastened state of the first holding element, in particular a plane perpendicular to a screw-in direction of a screw, for instance, by which the first holding element is fastened to the component of the vehicle. The carrier plane is defined as a plane through a contact surface between the carrier and the first holding element. The angle between the fastening plane and the carrier plane is defined as an angle by which the fastening plane must be rotated in the direction of the carrier in order to be parallel to the carrier plane, the angle being negative when the surface of the carrier points in the direction of a base and positive when the surface of the carrier points away from a base. In this context, a usual installation position of the carrier or the communication unit on the component of the in particular single-track vehicle is assumed.

The transmitter and/or receiver device may include an antenna, e.g., a GPS antenna and/or a broadband mobile radio antenna.

According to one advantageous example embodiment of the present invention, a second holding element for fastening the carrier to the component of the in particular single-track vehicle is provided. More specifically, the carrier may be positioned on the component of the vehicle with the aid of the second holding element and fixed in place by the first holding element so that it is unable to move. This offers the advantage that the carrier can be easily and reliably fastened to the component of the vehicle. More particularly, deflections of the carrier that may arise during a ride because of shocks are reduced.

According to another advantageous further refinement of the present invention, the second holding element is embodied as a tab, a lashing lug and/or as a projection of the carrier. This is advantageous insofar as the second holding element can be easily positioned on a carrier element of the component of the in particular single-track vehicle. More specifically, the carrier is able to be inserted, locked in place in and/or snapped into the carrier element. To this end, the carrier element may have a corresponding opening and/or indentation, which is/are developed to accommodate the second holding element. The tab, the lashing lug and/or the projection of the carrier can be inserted, locked in place in and/or snapped into the opening of the carrier element. As an alternative or in addition, the carrier element may also have an indentation which is developed to accommodate the second holding element. The second holding element may particularly be inserted, locked in place in and/or snapped into the indentation of the carrier element.

According to another advantageous refinement of the present invention, the first holding element is disposed on the carrier by a keyed and/or frictional connection, in particular in a reversible manner. This may offer the advantage that a reliable and flexible fastening is achievable in which the first holding element is disposed on the carrier, especially in an exchangeable or reversible manner, so that different first holding elements may be positioned on the carrier. As a result, the carrier is connectable to components or single-track vehicles having different dimensions, for example.

According to a further advantageous refinement of the present invention, the first holding element includes a carrier disk, which is situated on the carrier, in particular in a reversible manner, in particular screwed, locked in place in or snapped into the carrier. As an alternative or in addition, the first holding element includes a connection element which can be fastened to the component of the vehicle in a reversible manner. The connection element may particularly be screwed together with the component. The connection element includes a through-opening for this purpose. The connection element, for example, may be developed as a lug toward this end. Such a connection element offers the advantage that the first holding element can be easily and reversibly fastened to the carrier and to the component of the vehicle, in particular the drive unit and/or the frame of the vehicle. The carrier disk and the connection element may particularly be embodied as one piece. The connection element is disposed on the carrier disk at an angle, in particular. More specifically, the connection element is disposed at an angle on the carrier disk in such a way that the carrier plane and the fastening plane are situated at a defined angle relative to each other. The defined angle between the carrier plane and the fastening plane may particularly range from –60° to 90°, preferably from –10° and 90°, in particular from 0° to 90°. In one example embodiment of the present invention, in which the first holding element includes a carrier disk, the carrier plane is especially parallel to a plane of the main extension of the carrier disk, most particularly in a plane of a main extension plane of the carrier disk.

In one refinement of the first holding element according to the present invention, the connection element may be developed in an L-shape, one leg of the L-shaped connection element being disposed on the carrier, and one leg being provided for the reversible fastening to the component.

According to another advantageous refinement of the present invention, the first holding element may be positioned on the component of the in particular single-track vehicle with the aid of a screwed, locking, snap-in, bayonet-type and/or Velcro connection. This provides an easy way of fastening the first holding element to the component. In an advantageous manner, the first holding element may particularly be connected to the component of the vehicle, e.g., in the form of an electric bicycle, in a reversible manner so that the holding element can be removed from the vehicle for repair and/or maintenance purposes.

According to an advantageous refinement of the present invention, the angle between a fastening plane of the carrier that faces the vehicle in the fastened state of the carrier and a fastening plane of the first holding element is greater than 0°, in particular greater than 10°, preferably greater than 20°. The fastening plane of the first holding element particularly is defined as a plane through a connection element of the carrier that is connected to a drive unit and/or a frame of the in particular single-track vehicle. Thus, the fastening plane is parallel to the surface of the drive unit or the frame on which the first holding element is situated. Given a curved surface, the fastening plane is parallel to a tangent plane of the surface at the center point of the holding element. Positioning the underside of the carrier at an angle relative to the drive unit allows for a better alignment of the carrier away from interfering components of the vehicle so that the antenna has a better transmitter power output.

According to an additional advantageous refinement of the present invention, a fastening element for fastening the first holding element to the component is provided. This has the advantage that the carrier is easily connectable to the component of the vehicle such as a drive unit and/or a frame of the vehicle. The first holding element can therefore be connected either directly to the component or be connected to the component indirectly with the aid of the fastening element. The fastening element is particularly developed in such a way that it is connectable to the drive unit on the one hand and to the frame on the other hand, in particular in a reversible manner. The fastening element serves as a frame connection element and may act as a tolerance compensation element, for instance. In one example embodiment of the present invention, in which the first holding element is connected to the fastening element, the first holding element is connected at least to the drive unit and/or at least to the frame with the aid of the fastening element.

The fastening element may particularly be embodied as a fastening plate, a fastening angle or the like. It is preferably made of metal. The fastening element is able to be positioned on the component, i.e., the drive unit and/or the frame, with the aid of a screwed, locking, snap-in, bayonet-type and/or Velcro connection. In addition, the first holding element is able to be positioned on the fastening element with the aid of a screw, locking, snap-in, bayonet-type and/or Velcro connection.

According to a further advantageous refinement of the present invention, a carrier element is provided for fastening the second holding element to the component. The carrier element may be produced from a man-made material, in particular plastic and/or rubber. For instance, the carrier element may be fixed in place on the component, especially the drive unit of the in particular single-track vehicle, with the aid of a negative allowance fit. As an alternative or in addition, the carrier element can also be fixed in place on the fastening element, for instance with the aid of a negative allowance fit.

In one example embodiment of the present invention, the carrier element has an opening and/or an indentation to accommodate the second holding element. More specifically, the second holding element is able to be inserted, locked in place and/or snapped into the opening and/or the indentation.

Further important features and advantages of the present invention may be gathered from the disclosure herein, including, e.g., the figures and the associated figure description.

It is of course understood that the above-mentioned features and the features still to be described in the following text may be used not only in the indicated combinations but also in other combinations or on their own without departing from the framework of the present invention.

Preferred developments and embodiments of the present invention are shown in the figures and described in greater detail in the following description; identical reference numerals relate to identical or similar or functionally equivalent components or elements.

DETAILED DESCRIPTION OF EXAMPLE EMBODIMENTS

Figure 1A:
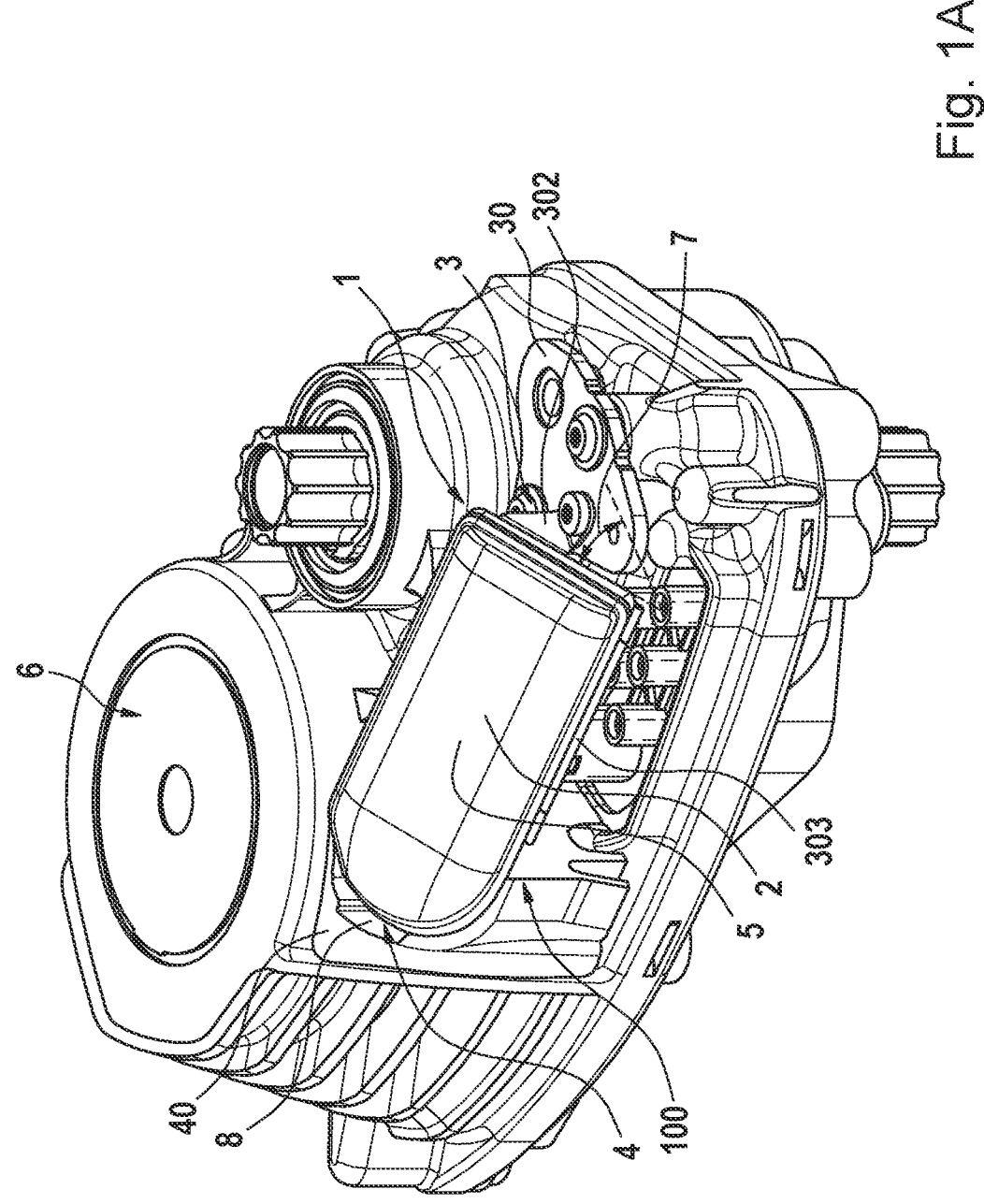
FIG. 1A shows a drive unit having a fastening device according to an example embodiment of the present invention in a schematic representation.

FIG. 1A shows a drive unit having a fastening device according to an embodiment of the present invention in a schematic illustration.

FIG. 1A shows a communication unit 100 on a drive unit 6. In addition, a fastening device 1 is shown, which includes a carrier 2, a first holding element 3 and a second holding element 4. Carrier 2 has an essentially rectangular topside 5 featuring rounded corners, two corners in the region of second holding element 4 being essentially completely rounded and forming a semicircle in a top view. First holding element 3 includes a connection element 302 and a carrier disk 303. With the aid of a fastening element 30, first holding element 3 is fixed in place on drive unit 6, fastening element 30 being optional and replaceable with other fastening elements or fastening methods, or it can be omitted. Fastening element 30 in the illustrated embodiment is fastened to drive unit 6 and to connection element 302 with the aid of a screw connection. Fastening element 30 is embodied as a fastening plate. Fastening element 30 is connected, in particular screwed, to drive unit 6. Fastening element 30 is also connected to frame 9 (not shown) with the aid of screws, in particular. Fastening element 30 is therefore situated between drive unit 6 and frame 9 and connected to both, drive unit 6 and frame 9, in a reversible manner, in particular with the aid of screws. In other words, drive unit 6 is indirectly connected to frame 9 by fastening element 30, in particular screwed together. Fastening element 30 serves as a frame connection element and may be used as a tolerance compensation element, for instance. Connection element 302 is connected to carrier disk 303, and carrier disk 303 is situated on carrier 2 and supports carrier 2. In the illustrated embodiment, connection element 302 is connected to carrier disk 303 in one piece (see FIG. 4). Connection element 302 is situated on carrier disk 303 at an angle. Connection element 302 has an L-shaped development and includes a leg that is situated on carrier disk 303 and a leg that is provided for the fastening to drive unit 6, here to fastening element 30. With the aid of connection element 302, communication unit 100 is able to be fastened to drive unit 6 in a defined position and/or at a defined angle in a reliable and reproducible manner.

Fastening element 30, in the form of a frame connection element in this case, and carrier disk 303 are spaced apart from each other at an angle 7 by connection element 302. This means that a plane along carrier disk 303 and a plane along fastening element 30 meet at an angle 7. This makes it possible to position carrier 2, and thus communication unit 100, at any desired yet defined angle relative to drive unit 6. In FIG. 1, the angle amounts to approximately −40°. The angle is negative because starting from fastening element 30, carrier 2 is rotated in the direction of a base (not shown) in a conventional use of communication unit 100 on drive unit 6 of an in particular single-track vehicle.

Second holding element 4 is inserted into a carrier element 40, carrier element 40 possibly being produced from rubber. Carrier 2 rests on carrier element 40 with the aid of second holding element 4 and is supported by carrier element 40. For this purpose, carrier element 40 has a bulging or indentation 8. Carrier element 40 is in turn fastened to drive unit 6, for instance with the aid of a negative allowance fit. When communication unit 100 is mounted on drive unit 6, carrier 2 can be positioned on carrier element 40 with the aid of second holding element 4 and fixed in position by first holding element 3, for instance by screwing first holding element 3 and fastening element 30 together.

Figure 1B:
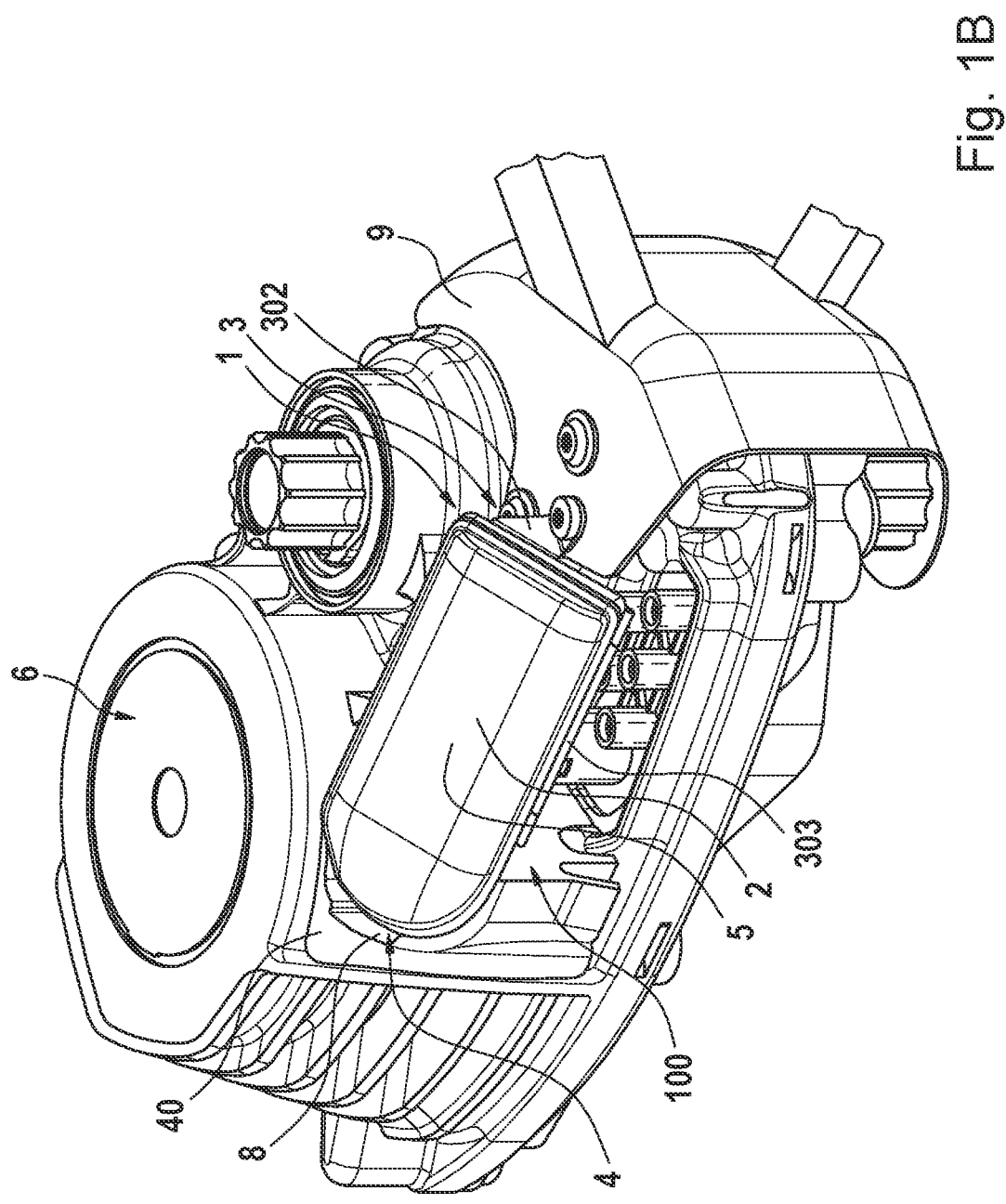
FIG. 1B shows a drive unit having a fastening device according to an example embodiment of the present invention in a schematic representation.

FIG. 1B shows a drive unit having a fastening device according to an embodiment of the present invention in a schematic representation.

FIG. 1B shows a further possible positioning of fastening device 1. Connection element 302 of first holding element 3 is connected directly to a frame 9. Similar to FIG. 1a, carrier 2 is positioned with a second holding element 4 in a carrier element 40. In contrast to FIG. 1a, however, connection element 302 is not situated on a drive unit 6 with the aid of a fastening element 30 but is fastened directly to a frame 9 of an in particular single-track vehicle (not shown). Drive unit 6 is also connected to frame 9, especially using screws. In the illustrated embodiment according to FIG. 1b, drive unit 6 is connected directly to frame 9, especially by screws, instead of being connected indirectly via fastening element 30 in the form of a fastening plate, as in the embodiment according to FIG. 1a. In a manner similar to FIG. 1a, frame 9 and carrier disk 303 in FIG. 1b are set apart from each other at a defined angle (not shown) by connection element 302. This means that a plane along carrier disk 303 and a plane along frame 9 meet each other at an angle.

Figure 2A:
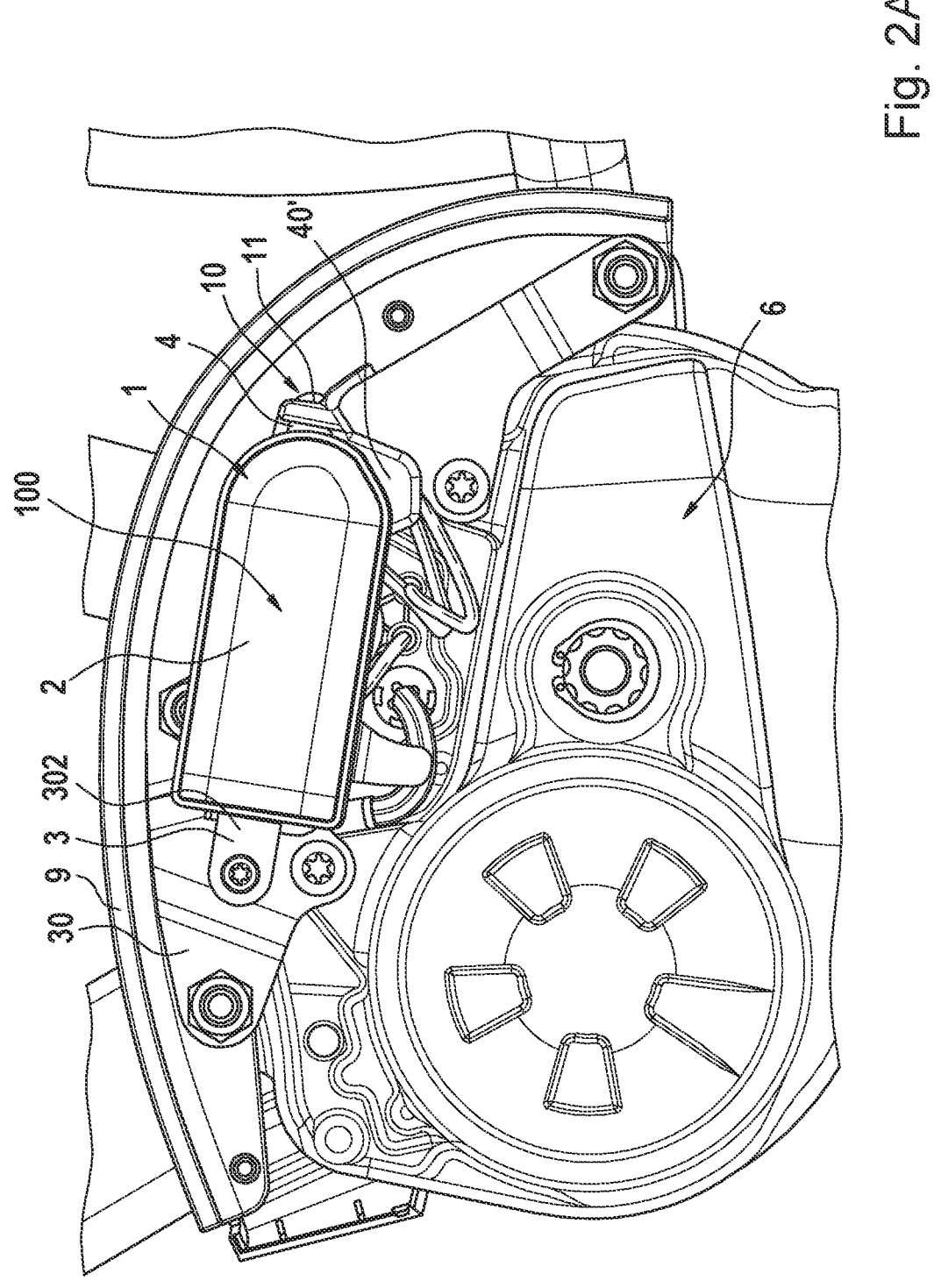
FIG. 2A shows a drive unit having a fastening device according to an example embodiment of the present invention in a schematic representation.

FIG. 2A shows a drive unit having a fastening device according to an embodiment of the present invention in a schematic representation.

FIG. 2A shows a further possible positioning of a communication unit 100 on a drive unit 6 with the aid of a fastening device 1. For the positioning on a carrier element 40', carrier 2 has a second holding element 4 in the form of a tab 10, which is inserted into a corresponding opening 11 in carrier element 40'. In the embodiment according to FIG. 2, carrier element 40' is situated on fastening element 30, e.g., with a negative allowance fit. When communication unit 100 is mounted on drive unit 6, carrier 2 with tab 10 is slipped into opening 11 and screwed together with a fastening element 30 with the aid of first holding element 3, especially with the aid of a connection element 302, so that fastening element 30 fixes carrier 2 in place on a frame 9 or on drive unit 6. Fastening element 30 may be fastened to frame 9 with the aid of a screw connection, a negative allowance fit or a keyed connection. In addition, fastening element 30 is fastened to drive unit 6, in particular by screws. Fastening element 30 is embodied as a fastening plate. Fastening element 30 is connected to drive unit 6, especially with the aid of screws. Fastening element 30 is also connected to frame 9, in particular using screws. As already shown in the embodiment according to FIG. 1a, fastening element 30 is therefore situated between drive unit 6 and frame 9 and connected to both, i.e., drive unit 6 and frame 9, in a reversible manner, in particular by screws. In other words, drive unit 6 is connected, in particular screwed together, with frame 9 with the aid of fastening element 30. Fastening element 30 serves as a frame connection element and may be used to compensate for tolerances, for example.

In the embodiment according to FIG. 2A, the carrier plane, that is, a plane through the carrier disk (not shown) and thus parallel to carrier 2, is essentially parallel to a fastening plane, that is, a plane through connection element 302. In other words, the angle (not shown) between the two planes essentially amounts to 0°. If carrier 2 were tilted in the direction of the sky (not shown), i.e., in the direction of frame 9, the angle would be positive. If carrier 2 were tilted in the direction of drive unit 6, i.e., in the direction of a base (not shown), on the other hand, the angle would be negative. 'In the direction of the sky' or 'in the direction of the base' relate to a conventional use for a drive unit of an in particular single-track vehicle. To prevent a negative effect on the transmitter and/or receiver power output of an antenna, the angle may not be smaller than −60°. At an angle of −90°, for example, i.e., the topside of carrier 2 points in the direction of drive unit 6 and in particular in the direction of the base, and the topside of carrier 2 is perpendicular to a plane through fastening element 30, carrier 2 would point fully in the direction of the base. Thus, the transmitter and/or receiver device (not shown) would not emit in the direction of a GPS satellite (not shown), for instance, so that the transmitter and/or receiver power output is inadequate.

Figure 2B:
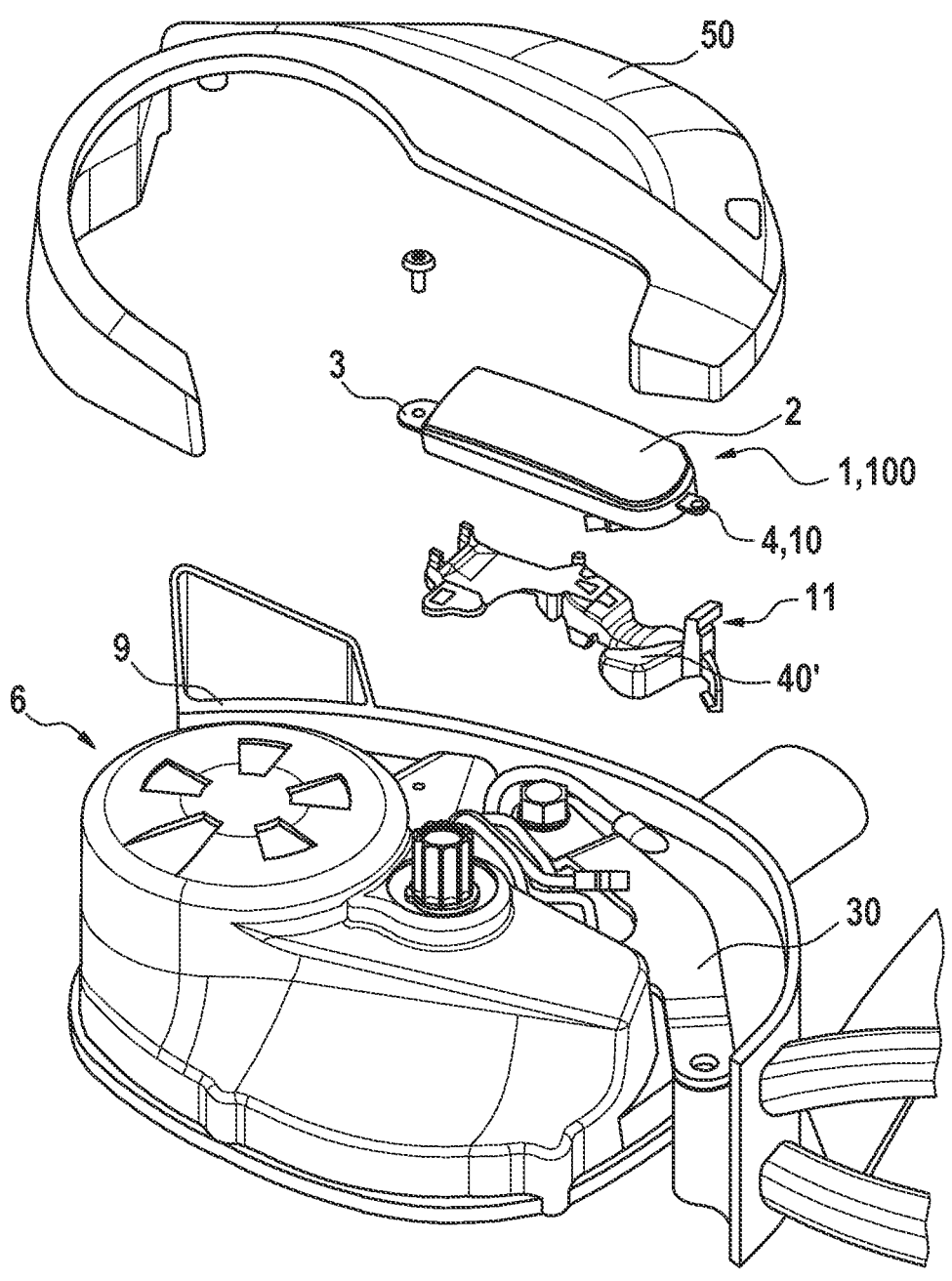
FIG. 2B shows a drive unit having a fastening device according to an example embodiment of the present invention in a schematic representation.

FIG. 2B shows a drive unit having a fastening device according to an embodiment of the present invention in a schematic representation.

FIG. 2B shows a possible positioning of fastening device 1 in an exploded view. Fastening element 30 is reversibly connected to frame 9 and is also reversibly connected to drive unit 6, in particular by screws. Carrier element 40' is fixed in place on fastening element 30. Carrier element 40' acts as a holder for carrier 2. For this purpose, carrier 2 has second holding element 4 in the form of a tab 10. Second holding element 4 of carrier 2 is inserted into opening 11 of carrier element 40' in order to position carrier 2 on drive unit 6 or frame 9. Via first holding element 3, fastening device 1 is fixed in place on fastening element 30. A cover 50 protects fastening device 1 from fluids and dirt.

Figure 3:
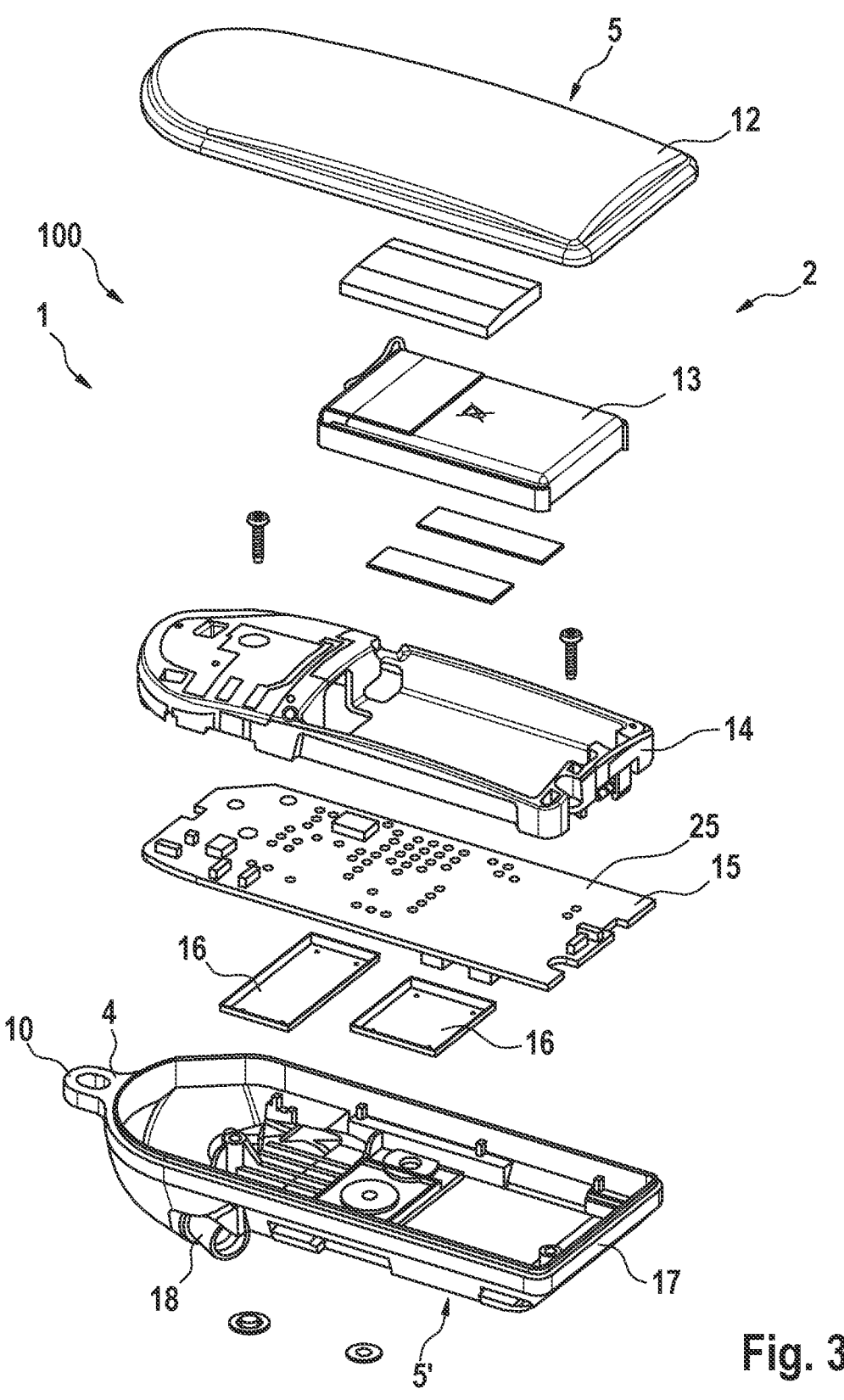
FIG. 3 shows an exploded drawing of a carrier of a fastening device according to an example embodiment of the present invention in a schematic representation.

FIG. 3, by way of example and in a schematic representation, shows an exploded view of a carrier of a fastening device according to an embodiment of the present invention.

FIG. 3 shows an exploded view of communication unit 100 having carrier 2 of fastening device 1. Carrier 2 includes a cover 12, a battery 13, an antenna carrier 14, a PCB circuit board 15, two shielding elements 16, and a bottom 17. Battery 13 and PCB circuit board 15 are fixed in place in antenna carrier 14. Via battery 13, electrical components (not shown) on PCB circuit board 15 are supplied with energy. PCB circuit board 15 together with electrical components and an antenna (not shown) are part of a transmitter and/or receiver device 25. Some of the electrical components on PCB circuit board 15 are shielded from electromagnetic radiation by shielding elements 16, which are situated on PCB circuit board 15. Via guide openings 18, PCB circuit board 15 is connectable with the aid of wires to an external device (not shown) for a current supply and/or for transmitting and/or receiving data.

With the aid of second holding element 4, in the form of a tab 10, disposed on bottom 17, carrier 2 is able to be positioned on a carrier element (not shown), in particular inserted into a carrier element. Examples of carrier elements 40, 40' are shown in FIGS. 1 and 2.

In a fastened state of carrier 2, cover 12 has topside 5 and bottom 17 has underside 5'.

Because of a modular construction, antenna carrier 14 with PCB circuit board 15 is removable from carrier 2 and can be replaced with another electronics device.

Figure 4:
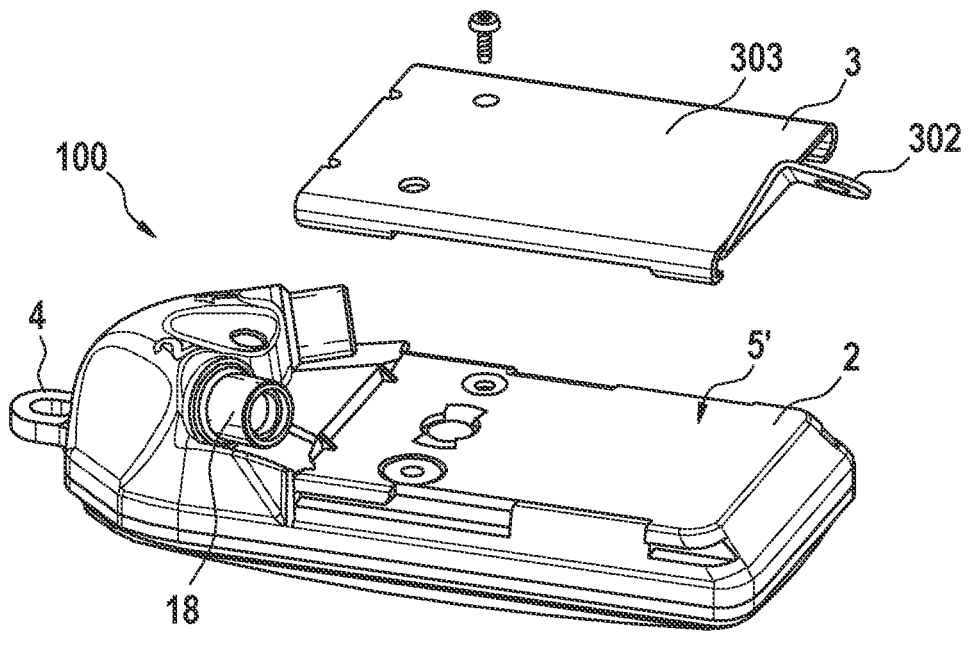
FIG. 4 shows a carrier of a fastening device according to an example embodiment of the present invention in a schematic representation.

FIG. 4 shows a carrier of a fastening device according to an embodiment of the present invention in a schematic representation.

A carrier disk 303 of a first holding element 3 is fixed in place by a screw on underside 5' of carrier 2 shown in FIG. 4. Because of the screw, carrier disk 303 is connected to carrier 2 in a reversible manner, which means that first holding element 3, including carrier disk 303 and a connection element 302, is able to be exchanged. This makes it possible to mount carrier 2 on different drive units or single-track vehicles, in particular. More specifically, the angle between carrier 2 and the drive unit or the in particular single-track vehicle is able to be adapted by a suitably developed first holding element 3.

Carrier disk 303 surrounds or covers at least 50% of underside 5' of carrier 2 so that an electric coupling between the reference plane of the antenna in PCB circuit board 15 and carrier disk 303 is provided.

Figure 5:
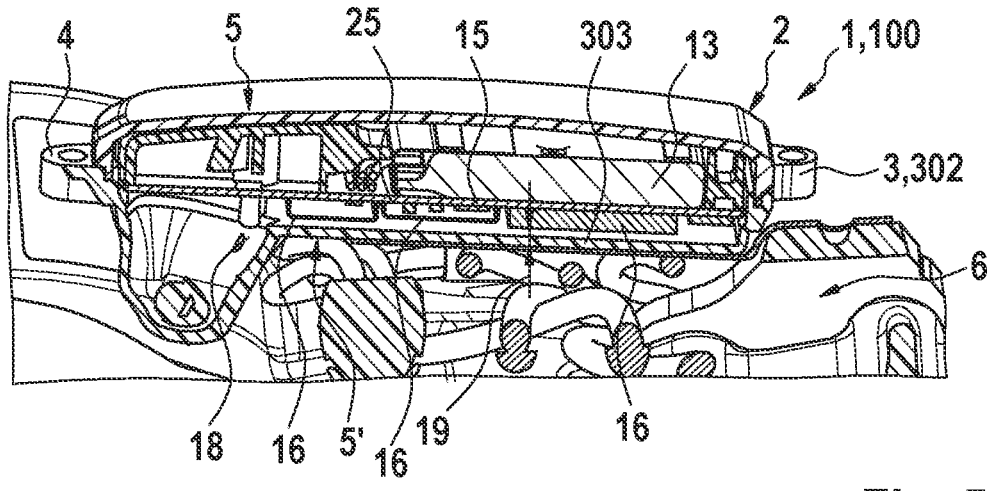
FIG. 5 shows a sectional view of a fastening device according to an example embodiment of the present invention in a schematic representation.

FIG. 5 shows a sectional view of a fastening device according to an embodiment of the present invention in a schematic representation.

FIG. 5 shows a communication unit 100 including carrier 2 in a cross-section. Battery 13 and transmitter and/or receiver device 25 including PCB circuit board 15 are positioned in carrier 2. Shielding elements 16 shield PCB circuit board 15 in the direction of drive unit 6. Because of carrier disk 303, which surrounds at least 50% of underside 5' of carrier 2, the shielding is further improved. Since first holding element 3 is made of metal and fixed in place directly on drive unit 6, they are galvanically connected. Due to the small clearance between carrier disk 303 and shielding elements 16, PCB circuit board 15 is capacitively coupled with carrier disk 303. Drive unit 6, and especially carrier disk 303, thus acts as a reference ground for PCB circuit board 15, i.e., is part of the grounding of PCB circuit board 15.

Clearance 19 between carrier disk 303 and a shielding element 16 amounts to 2 mm or less.

Underside 5' is pointing toward drive unit 6, and topside 5 is pointing away from drive unit 6. This makes it possible for the antenna on PCB circuit board 15 to transmit and receive data via topside 5 without metallic objects affecting the transmitter and/or receiver power output. At the same time, carrier disk 303 protects the antenna from below from interference by drive unit 6.

By way of guide openings 18, PCB circuit board 15 is connected to an external device (not shown) of drive unit 6 or the in particular single-track vehicle. The external device may include a control unit and/or an energy supply device, for example.

Figure 6:
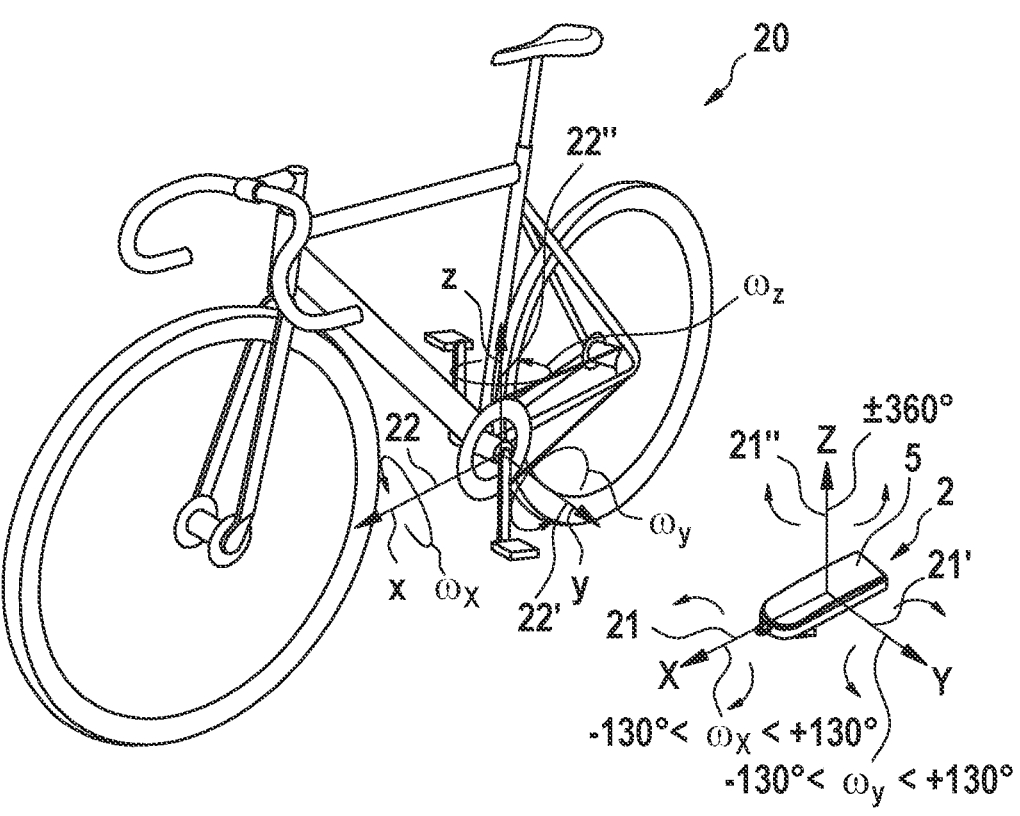
FIG. 6 shows a single-track vehicle and a carrier according to an example embodiment of the present invention in a schematic representation.

FIG. 6 shows a single-track vehicle and a carrier according to an embodiment of the present invention in a schematic representation.

FIG. 6 shows a single-track vehicle 20 and a communication unit having a carrier 2. Plotted on carrier 2 are an X, Y and Z axis 21, 21', 21" on the basis of which the orientation of carrier 2 is also able to be described. Corresponding x, y and z axes 22, 22', 22" are shown on single-track vehicle 20. The directions of X, Y and Z axes 21, 21', 21" of carrier 2 correspond to the directions of x, y and z axes 22, 22', 22" of single-track vehicle 20, so that the orientation of carrier 2 corresponds to the orientation of carrier 2 on single-track vehicle 20.

In order to ensure an adequate transmission and/or receiving power output of an antenna, topside 5 of carrier 2 points away from components, if possible, in particular away from drive unit 6 of the single-track vehicle and away from a base, i.e., in the direction of positive z-axis 22". In other words, the rotation of carrier 2 about X-axis 21 and about Y-axis 21' may amount to maximally 130°. Defined as 0° is the position shown in FIG. 6 where surface 5 is situated perpendicular to Z-axis 21". With reference to a fastening plane that runs along x-axis 22 and z-axis 22" in FIG. 6, the carrier plane, which runs along X-axis 21 and Y-axis 21' in FIG. 6, is maximally rotated at an angle of between −60° and 220°. Carrier 2 shown in FIG. 6, for instance, is rotated by 90° relative to the fastening plane. Carrier 2 may be rotated about Z-axis 21" at any angle because this does not change the portion of topside 5 that points in the direction of the base.

Figure 7:
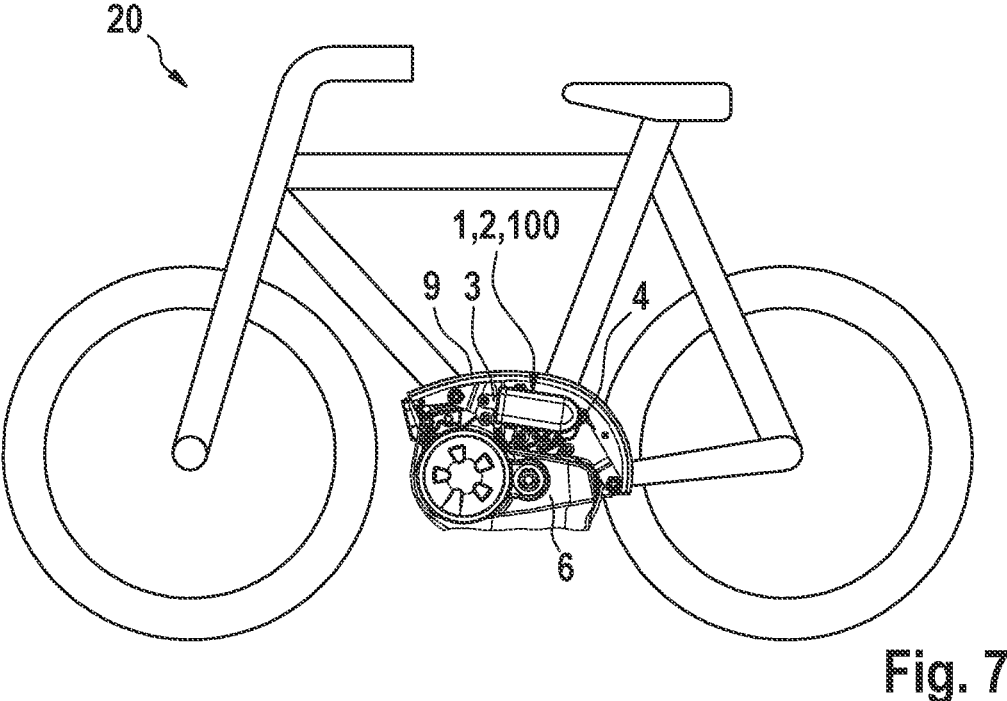
FIG. 7 shows a single-track vehicle according to an example embodiment of the present invention in a schematic representation.

FIG. 7 shows a single-track vehicle according to one embodiment of the present invention in a schematic illustration.

FIG. 7 shows a single-track vehicle 20 having a drive unit 6 and a communication unit 100 with fastening device 1 for fastening electromagnetic transmitter and/or receiver device 25 to drive unit 6 or frame 9. Fastening device 1 includes a first holding element 3, a second holding element 4, and a carrier 2 such as in the embodiment of FIG. 2, for example. Carrier 2 is fixed in position on drive unit 6 or on frame 9 with the aid of fastening device 1.

In summary, at least one embodiment of the present invention has at least one of the following features and/or provides at least one of the following advantages:

Reliable fastening of a transmitter and/or receiver device to an in particular single-track vehicle such as an electric bicycle, a flexible positioning of the transmitter and/or receiver device in terms of the angle and position of the transmitter and/or receiver device on an in particular single-track vehicle such as an electric bicycle, a high transmission and/or receiving power of the transmitter and/or receiver device.

Although the above invention has been described based on preferred exemplary embodiments, it is not restricted to such embodiments but may be modified in a wide variety of ways.

What is claimed is:

1. A communication unit, comprising:
an electromagnetic transmitter and/or receiver device; and
a fastening device for the electromagnetic transmitter and/or receiver device, the fastening device configured to fasten to a component of a vehicle, the fasting device including:
a flat, rectangular carrier having two oppositely situated sides on which the transmitter and/or receiver device is situated, and
at least a first holding element, the first holding element being configured to fasten the carrier to the component in a positionally stable manner.

2. The communication unit as recited in claim 1, wherein the component is a drive unit and/or a frame of a single-track vehicle.

3. The communication unit as recited in claim 1, wherein the first holding element defines a fastening plane, and the carrier defines a carrier plane, the carrier plane having an angle of −60° to 90° relative to the fastening plane.

4. The communication unit as recited in claim 3, wherein an angle between the carrier plane that faces the vehicle in a fastened state of the carrier and a fastening plane of the first holding element is greater than 0°.

5. The communication unit as recited in claim 1, further comprising:

a second holding element to fasten the carrier to the component of the vehicle.

6. The communication unit as recited in claim 5, wherein the second holding element is a tab and/or a lashing lug and/or a projection of the carrier.

7. The communication unit as recited in claim 5, further comprising:

a carrier element for fastening the second holding element to the component.

8. The communication unit as recited in claim 7, wherein the carrier element has an opening and/or an indentation configured to accommodate the second holding element.

9. The communication unit as recited in claim 1, wherein the first holding element is disposed on the carrier by a keyed and/or frictional connection, in a reversible manner.

10. The communication unit as recited in claim 1, wherein the first holding element includes: a carrier disk, which is situated on the carrier in a reversible manner, and/or a connection element which is able to be fixed in place on the component in a reversible manner.

11. The communication unit as recited in claim 10, wherein the connection element has an L-shaped development.

12. The communication unit as recited in claim 1, wherein the first holding element is configured to be positioned on the component using a screwed and/or locking and/or snap-in and/or bayonet-type and/or Velcro connection.

13. The communication unit as recited in claim 1, further comprising:

a fastening element configured to fasten the first holding element to the component.

14. The communication unit as recited in claim 13, wherein the fastening element is a fastening plate or a fastening angle.

15. The communication unit as recited in claim 13, wherein the fastening element is configured to be positioned on the component using a screwed and/or locking and/or snap-in and/or bayonet-type and/or Velcro connection.

16. The communication unit as recited in claim 13, wherein the first holding element is configured to be positioned on the fastening element using a screwed and/or locking and/or snap-in bayonet-type and/or Velcro connection.

17. A vehicle, comprising:

a communication unit, including:

an electromagnetic transmitter and/or receiver device; and a fastening device for the electromagnetic transmitter and/or receiver device, the fastening device configured to fasten to a component of the vehicle, the fasting device including:

a flat, rectangular carrier having two oppositely situated sides on which the transmitter and/or receiver device is situated, and at least a first holding element, the first holding element being configured to fasten the carrier to the component in a positionally stable manner.

18. A drive unit for a vehicle, comprising:

a communication unit, including:

an electromagnetic transmitter and/or receiver device; and a fastening device for the electromagnetic transmitter and/or receiver device, the fastening device configured to fasten to a component of the vehicle, the fasting device including:

a flat, rectangular carrier having two oppositely situated sides on which the transmitter and/or receiver device is situated, and at least a first holding element, the first holding element being configured to fasten the carrier to the component in a positionally stable manner.

* * * * *